United States Patent [19]

Hirose et al.

[11] Patent Number: 4,697,758

[45] Date of Patent: Oct. 6, 1987

[54] FISHING REEL WITH MICROCOMPUTER

[75] Inventors: Haruomi Hirose; Takashi Atobe, both of Tokyo, Japan

[73] Assignee: Daiwa Seiko, Inc., Tokyo, Japan

[21] Appl. No.: 733,895

[22] Filed: May 14, 1985

[30] Foreign Application Priority Data

| May 21, 1984 [JP] | Japan | 59-102002 |
| May 21, 1984 [JP] | Japan | 59-102003 |
| May 21, 1984 [JP] | Japan | 59-102004 |
| May 21, 1984 [JP] | Japan | 59-102005 |

[51] Int. Cl.$^4$ ............................................. A01K 89/015
[52] U.S. Cl. ........................... 242/84.1 M; 33/129; 33/132 R; 43/20
[58] Field of Search ............ 242/84.1 M, 84.1 R, 242/84.52 R; 33/129, 132 R; 43/20, 21; 254/267

[56] References Cited

U.S. PATENT DOCUMENTS 4,378,652  4/1983  Lindgren .................................. 43/21
4,438,391  3/1984  Rog et al. ............................ 33/132 R

FOREIGN PATENT DOCUMENTS 57-15847   4/1982  Japan ............................ 242/84.1 R
57-40788   9/1982  Japan ............................ 242/84.1 R
57-155931  9/1982  Japan .

Primary Examiner—Billy S. Taylor
Attorney, Agent, or Firm—Kalish & Gilster

[57] ABSTRACT

A fishing reel having a rotatable spool for winding thereon a fishing line, a Hall-effect sensor for detecting the spool rotation, and a microcomputer including an up/down counter for receiving signals from the sensor to count the number of spool revolutions during paying out and winding up of the fishing line. Calculation is provided by the microcomputer for determining the lengths of the paid out portion and the wound up portion of the fishing line with there being a display unit for displaying the calculated lengths. A memory associated with the microcomputer provides for selection from one of a plurality of formulas for calculation of line lengths corresponding to various line diameters. A control is provided for resetting the displayed value to 0 when the line is completely wound up.

7 Claims, 14 Drawing Figures

FISHING REEL WITH MICROCOMPUTER

BACKGROUND OF THE INVENTION

1. Field of the Invention

The present invention relates to a reel for fishing and, more particularly, to a fishing reel which can accurately measure the length of the paid out portion and the length of the wound portion of a fishing line during fishing.

2. Description of the Prior Art

Recently, fishing reels have been developed which permit the user to measure the length of a fishing line that is paid out from a spool or wound on the spool. The reels are equipped with a mechanism for displaying the length in digital form. These operations are performed under the control of a microcomputer.

A method of measuring the length of the paid out portion and the length of the wound portion of a fishing line is disclosed in Japanese Patent Laid-Open No. 155931/1984, where the rotation of a spool is detected by a sensor which produces a pulse whenever the spool makes one revolution. The produced pulses are counted by a counter and the obtained total count is input to a microcomputer with its arithmetic period so that the data may be arithmetically processed. The obtained result is displayed on a display unit.

Unfortunately, this prior art method has several disadvantages. Specifically, the diameter of the winding of a fishing line on a spool decreases when the line is paid out and increases when it is wound up. Therefore, the length of the line paid out or wound up per revolution of the spool varies with the diameter of the winding. For this reason, if the number of pulses which is obtained from the number of revolutions of the spool per unit length, e.g., 1 m, is measured at it is, it will not be possible to achieve accurate measurement of length of line. Further, if a fishing line having a different diameter is used, the rate at which the diameter of the winding changes when the line is paid out or wound up becomes different. Consequently, it has been impossible to accurately measure the length of the paid out portion and the length of the wound up portion according to the diameter of the line used. Another problem arises when the paid out portion of a fishing line breaks when the submerged fishing tackle is tightly caught on a rock or the like. Under this condition, after the remaining, paid out portion of the line has been wound up, the numerical display presented on the display unit does not indicate zero. When the line is next paid out, the displayed value is the sum of the length of the lost portion and the length of the portion presently paid out. Thus, it is impossible to precisely know the length of the portion paid out. Also, correct display is not possible to attain. Since fishing is always accompanied by breakage of the paid out portion, it is necessary to precisely know the total length of the fishing line wound on a spool.

Where a casting is done using a rod equipped with a casting reel or spinning reel, when a lure, or artificial bait, is cast, the rod is swung downwardly toward a desired point. At the same time, the spool is made free to rotate, and the lure is thrown into the point. At this time, the distance traveled by the lure is controlled with his thumb. When the lure touches the water, the release of the fishing line is stopped. Under this condition, he waits for the lure to fall to a layer in which fish swim. This is normally known as countdown. After the lure for which a countdown is being effected reaches the layer, e.g., a bottom, the rod is put upright and the spool is rotated to wind up the line. Thus, the lure is moved a certain amount from the reached position, and then it is stopped for a short time. Subsequently, the winding operation and pause are repeated until a fish is sensed. The movement of the lure is caused to imitate the movement of a true bait.

The series of operations of the submerged tackle or the lure during the casting as mentioned above has heretofore usually relied on the angler's sensation. However, when such a layer in which fish swim is an intermediate layer, or when the submerged tackle can easily be tightly caught because of the presence of a rock on the sea floor, the countdown for the lure must be halted on its way. In this case, if the countdown for the lure relies on the angler's sensation, the amount that the lure sinks cannot be correctly known. Especially, if the angler is not experienced in casting, it is almost impossible for him to know the amount of sinking. In addition, it is hardly expected that the tackle is successfully located in a fish swimming layer that is an intermediate layer.

Casting reels for use with rods that are cast with one hand are small in size. Usually, these reels are provided with neither a microcomputer for measuring the length of a fishing line nor a display unit. Even if the method disclosed in Japanese Utility Model Publication No. 57585/1983 is used for a casting reel, and if the length of a line can be measured and displayed, it will be of little use for the casting operation as described above. What the angler can know is only the distance between the shore and the position at which the submerged fishing tackle dips into the water. Especially, in case where a rod is operated and a reel is operated to wind up the line so that the lure may be pulled from its sunk position toward the shore while giving a motion to the lure, if attention is paid to the display unit indicating the length of line, then the angler will not be able to see the movement of the tip of the rod and the fishing line. Further, the movement of the lure becomes unnatural, giving caution to fish.

SUMMARY OF THE INVENTION

The foregoing problems with the prior art technique have been successfully solved by the present invention.

It is an object of the present invention to provide a fishing reel which permits one to measure the length of the paid out portion and the length of the wound portion of a fishing line with increased accuracy, and which allows repeated release and winding without accumulation of errors between these two lengths.

It is another object of the invention to provide a fishing reel which permits one to measure the length of the paid out portion and the length of the wound portion of a fishing line with increased accuracy, and which can precisely measure and display the length of the paid out portion at all times, even in the case where the paid out portion breaks, in which case the length of the lost portion is automatically subtracted from the total length of the line to obtain the correct value of the total length.

It is a further object of the invention to provide a fishing reel which permits one to easily and relatively certainly forecast the sinking of the submerged fishing tackle after it has sunk into the water, to optimally adjust the velocity at which the tackle as lying in a fish swimming layer is drawn toward the angler as well as the distance that it moves, and to readily know points at which fish are found.

It is still another object of the invention to provide a fishing reel which permits one to measure the length of the paid out portion and the length of the wound portion of a fishing line with increased accuracy, and which enables the total length of line wound on a spool to be precisely input to the reel.

As a first feature of the present invention, the measuring accuracy is improved by a line diameter input means. More specifically, a calculational formula adapted for a specific line diameter is selected for each different fishing line, and then the length of a line is measured and calculated using the formula. Therefore, it is unlikely that errors in the length of the paid out portion and in the length of the wound portion arise from a different line diameter of the used fishing line or from the changing diameter of the winding of the line. Thus, precise measurement is invariably assured. Consequently, the angler can measure a desired length without the need to check the condition of a layer in which fish swim or points around which fish swarm, or the condition of a lake floor or the ups and downs of a sea floor. Hence, the angler can fish efficiently.

As a second feature of the invention, error is prevented from being accumulated by means of a reset means that is operated at the end of a winding operation. Specifically, the length of the wound portion is subtracted from the length of the paid out portion of a fishing line and the result is displayed. Whenever a winding operation is finished, the displayed value is reset to zero. Even after release and winding are repeated many times, the value presented on the display unit is automatically reset to zero for every new release of line, preventing accumulation of error. This eliminates the possibility that a display error arises between the length of the paid out portion and the length of the wound portion. Hence, especially when the line is let out, the angler can aim at a point accurately. Even if the fishing line is stretched slightly while it is in use, no problem will take place, because the displayed value is reset to null whenever the line is additionally payed out.

As a third feature of the invention, a total line length input means has a set switch that permits an input operation. Specifically, the total length of the line wound on a spool is input to the reel by turning on the set switch. As the need arises, the angler can mount an alternative spool on the reel, and he can enter the total length of the line wound on the alternative spool into the reel only with one touch. Therefore, the reel can be operated easily, simply, quickly, and quite conveniently.

As a fourth feature of the invention, the length of a fishing line is automatically input to the reel by a total line length input means when the line is wound on a spool. Specifically, the whole length of a line is first wound on a spool. The total length of this line can be input to the reel. Therefore, as the angler himself actually winds up the line on a spool carrying no line, the length is automatically input to the reel. Consequently, the accuracy of the length of the wound portion can be enhanced, resulting in a practical advantage.

As a fifth feature of the invention, a total line length input means permits the user to know the length of the wound portion. Specifically, the total length of the line wound on a spool is input to the reel, permitting the angler to precisely know the total length. In addition, if necessary, the total length can be displayed on the display unit. Therefore, the angler can easily visually check the total length of the line wound on the spool as the need arises. Hence, he can rapidly respond to the kind of fish and the conditions of fishing in a quite convenient manner.

As a sixth feature of the invention, a total line length input means automatically corrects the displayed value upon breakage of the line. Specifically, the total length of the line wound on a spool is input to the reel. When the paid out portion breaks, the displayed total length of the line which is wound on the spool is automatically corrected such that the length of the lost portion is subtracted from the total length. Accordingly, in case where the submerged fishing tackle is firmly caught on a rock or the like and the line is inadvertently cut, the automatic correction is made and so the angler can see the correct value. Therefore, he can always know the length of the paid out portion and the total length of the wound portion precisely. This facilitates controlling the fishing line. Since he can read the correct total length of the wound portion after the breakage, there arises no possibility that during the subsequent fishing, the line is paid out improperly, leading to a breakage of the line.

As a seventh feature of the invention, the depth of water can be measured in a straightforward manner. Specifically, a calculational formula adapted for a specific line diameter is selected for each different diameter of fishing line. A measurement is made, and the total length is calculated using this formula. Therefore, the depth of water to a layer in which fish swim can be readily found by resetting the display unit to zero count when the submerged fishing tackle comes into contact with the surface of water. Accordingly, when he jigs, a layer in which fish are found, the ups and downs of a lake floor and a sea floor can be detected easily.

As an eighth feature of the invention, the angler can know the condition of a fishing tackle including a weight for which a countdown is carried out from the instant at which it comes into contact with the surface of water, as well as the manner of movement of the tackle at an intended depth. Specifically, a timer means is started when the fishing line is paid out in response to the cast of the tackle. The timer means produces an alarm sound at predetermined time intervals. Further, when the reel is wound up to move the tackle, an alarm sound is produced for every given unit length of the wound fishing line. Thus, the angler can see the manner of sinking of the tackle or countdown after it enters the water, through the alarm sound that is generated at the given intervals. Also, he can optimally adjust the amount that the tackle is drawn and its velocity, by making use of the alarm sound that is produced for every given unit length of the wound line. Further, he can readily know the point at which fish swarm, by counting the alarm sounds. In addition, the angler can readily perform a casting operation.

DETAILED DESCRIPTION OF THE INVENTION

Figure 1:
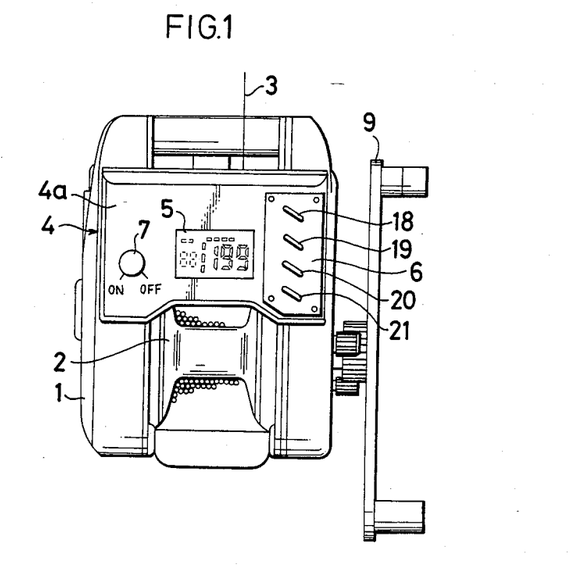
FIG. 1 is a plan view of the casting reel of a first example of the invention.
Figure 2:
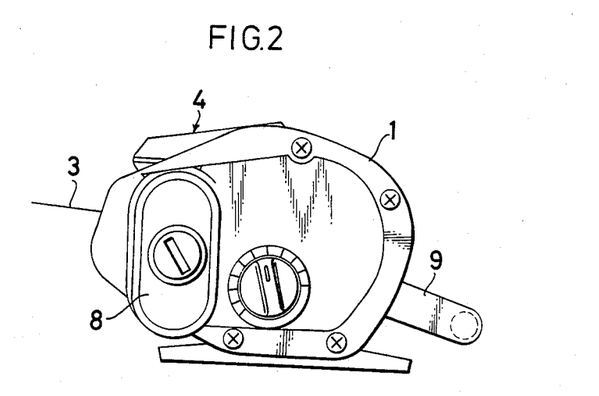
FIG. 2 is a side elevation of the reel shown in FIG. 1.

Referring to FIGS. 1 and 2, there is shown the body of a casting reel that constitutes a first example of the present invention. A spool 2 is rotatably mounted to the body 1 of the reel. A fishing line 3 is coiled on the spool 2. A waterproof housing 4 is coupled to the body 1. The housing 4 has a panel 4a on its upper surface. A display unit 5, a keyboard 6, and a power switch 7 are mounted on the panel 4a in a watertight manner. The housing 4 incorporates a sensor for detecting the rotation of the spool and its direction. Also incorporated in the housing is a microcomputer for calculating the length of the paid out portion and the length of the wound portion of the line from the number of revolutions detected by the sensor. The sensor and the microcomputer will be described in greater detail later. The housing 4 is provided with a space 8 in which a small-sized battery is received. A handle 9 is provided to wind up the line on the spool.

Figure 3:
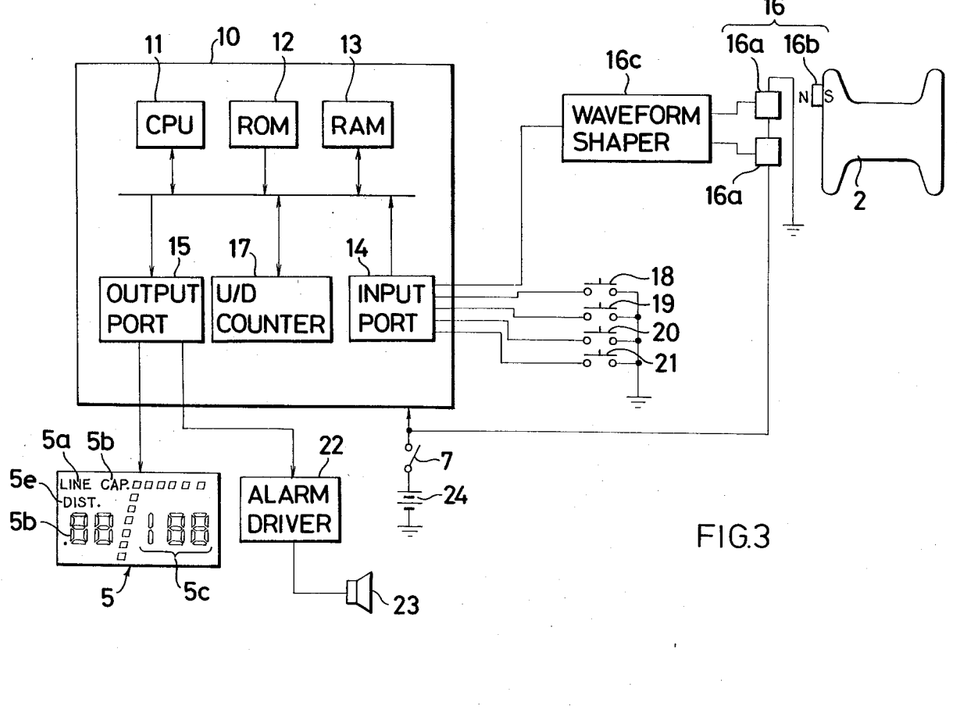
FIG. 3 is a block diagram of the casting reel control circuit of the first example.

FIG. 3 shows the structure of the circuit incorporated in the casting reel shown in FIGS. 1 and 2. This circuit acts to set the diameter and the total length of the line on the reel, to measure the lengths of the paid out portion and the length of the wound portion of the line, and to reset the displayed line length to zero when the released portion of the line is fully wound up except for its final given length. Generally indicated by reference numeral 10 is the aforementioned microcomputer, which consists of a central processing unit 11, a ROM 12 in which a program or the like for the arithmetic operation performed by the CPU 11 is stored, a RAM 13 for storing input data and the result of the arithmetic operation, an input port 14, and an output port 15. The CPU 11 controls and manages the memory for storing the program, the memory for storing data, and input-/output devices. Also, the CPU performs arithmetic and transfer operations necessary to process given jobs.

The aforementioned sensor for detecting the rotation of the spool 2 and its direction is indicated by numeral 16. This sensor consists of a pair of Hall effect devices 16a and a magnet 16b firmly fixed to the spool 2. Whenever the spool 2 makes one revolution, the magnetic field produced by the magnet 16b acts on the devices 16a. The resultant Hall effect produces a voltage having a certain phase across the Hall effect devices 16a. The direction of the voltage depends on whether the spool 2 rotates clockwise or counterclockwise. The set up voltage is applied to a waveform shaping circuit 16c, so that the voltage is shaped into pulses having a repetition frequency proportional to the rotational frequency of the spool 2. The pulses are furnished to the CPU 11 via the input port 14. The CPU 11 incorporates an up-/down counter 17, which counts the pulses forward or backward. The length of the paid out portion and the length of the wound portion are calculated from the total count obtained by the counter with its arithmetic period. The result of the processing made by the CPU 11 is stored in the RAM 13 or output to the display unit 5 via the output port 15.

Connected to the input port 14 of the microcomputer 10 are a mode selector switch 18 for switching the mode of the microcomputer 10 among line diameter input mode, total line length input mode, and measurement mode, a set switch 19 for allowing a line diameter and a total length of line to be entered to the reel, a reset switch 20 for resetting the displayed line length to zero value in the total line length input mode and in the measurement mode, and a mode switch 21 for turning on or off the microcomputer 10 except for its internal circuit. These switches 18–21 are arrayed on the keyboard 6. An alarm driver circuit 22, to which an alarm 23 is connected, is connected with the output port 15. This alarm 23 is used to produce a reference sound for the timing of countdown performed after a submerged fishing tackle enters the water and for the timing of a subsequent pull on the tackle. Also shown is a power supply 24.

Figure 4:
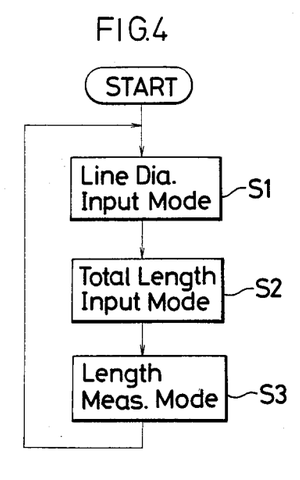
FIG. 4 is a flowchart showing the sequence of operations for changing mode in the first example.
Figure 5:
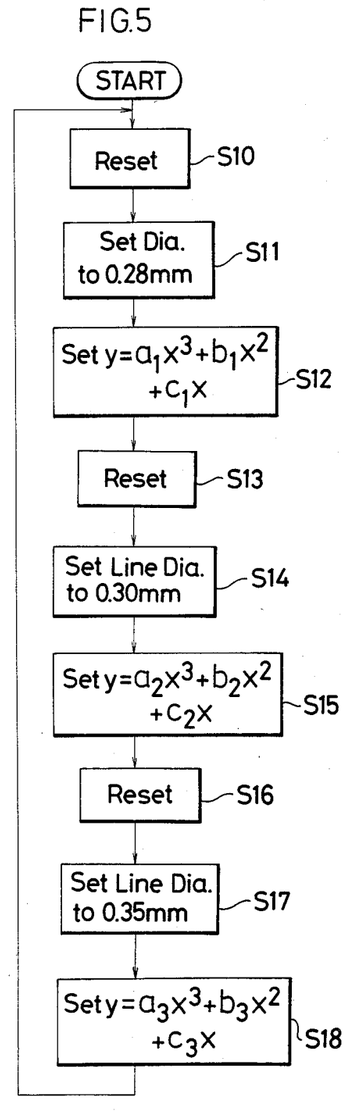
FIG. 5 is a flowchart showing the sequence of operations for entering a line diameter to the reel of the first example.
Figure 6:
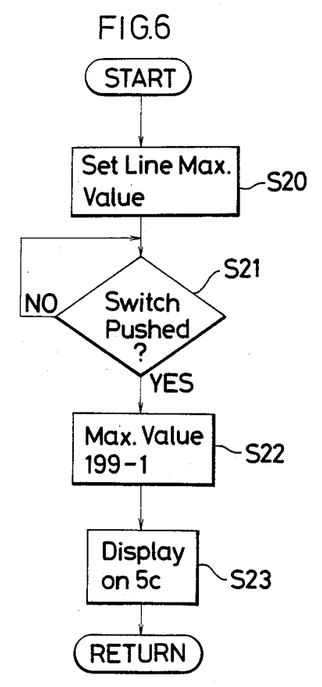
FIG. 6 is a flowchart showing the sequence of operations for entering the total length of a line to the reel of the first example.
Figure 7:
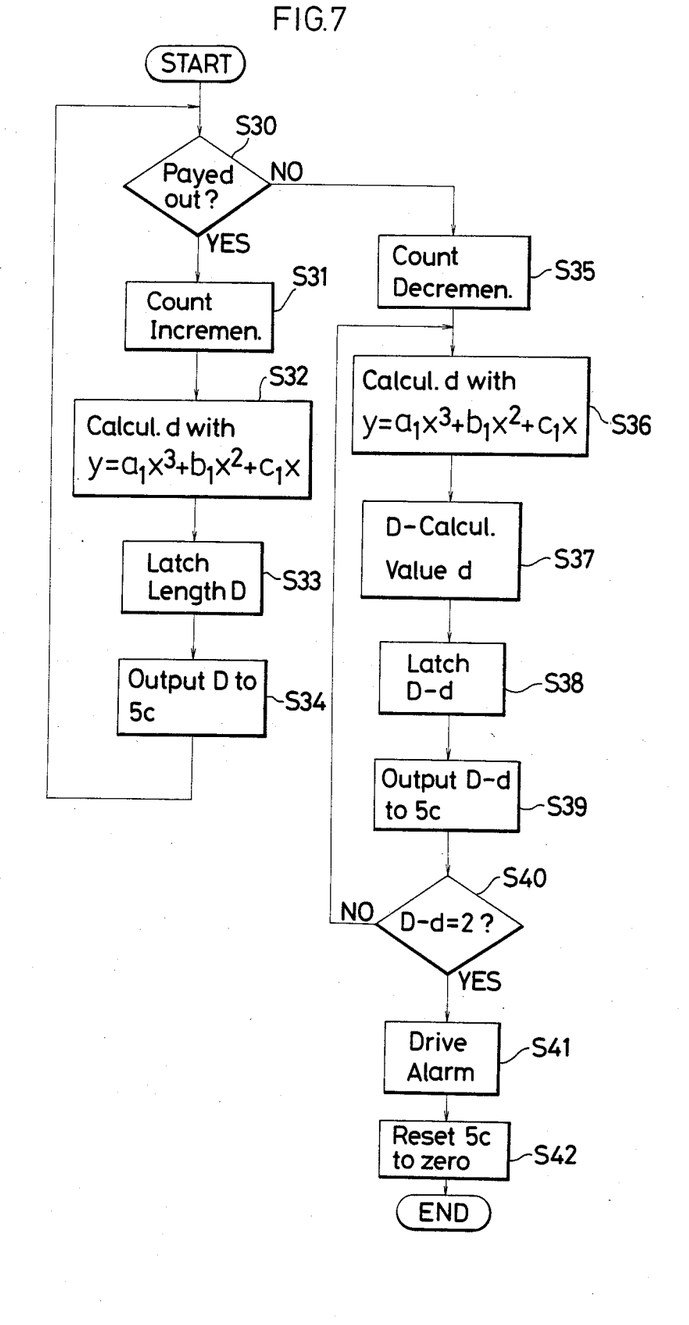
FIG. 7 is a flowchart showing the sequence of operations for paying out the line and for winding it up in the first example.

FIG. 4 shows the sequence of operations that is performed to switch the mode by operating the mode selector switch 18. FIG. 5 shows the sequence of operations that is performed to enter a line diameter to the reel. FIG. 6 shows the sequence of operations that is carried out to enter a total length of line to the reel. FIG. 7 shows the sequence of operations that is performed to measure the length of line. Programs for these procedures are stored in the ROM 12 in the microcomputer 10.

In the operation of the apparatus constructed as described above, when the power switch 7 is closed, the microcomputer 10 is initialized. Under this condition, if the mode selector switch 18 is intermittently depressed, the mode of the microcomputer 10 is changed to the line diameter input mode (step S1 in FIG. 4), the total line length input mode (step S2), and the line length measurement mode (step S3) in turn.

The steps S1–S3 shown in FIG. 4 are carried out in a cyclic manner by operating the selector switch 18. These will be hereinafter referred to as "normal modes". When the mode switch 21 is depressed once, the microcomputer is switched from one of the normal modes to off mode in which no input is entered. If the switch 21 is again depressed, the microcomputer is restored to one of the normal modes.

When the microcomputer 10 is placed in the line diameter input mode, the word "LINE" 5a on the display unit 5 lights up or flashes, indicating that the microcomputer is in the line diameter input mode. At the same time, the designation of the line diameter is enabled. Then, the set switch 19 is repeatedly closed on to conduct the routine for entering a line diameter as shown in FIG. 5.

During the routine for entering a line diameter as shown in FIG. 5, as the set switch 19 is repeatedly closed on, the steps S10–S12, the steps S13–S15, and the steps S16–S18 are successively carried out in a cyclic way. For example, three kinds of line diameters 0.28 mm, 0.30 mm, and 0.35 mm are displayed, and the corresponding formulas for calculating the line length are established.

When the set switch 19 is first closed, the display portion 5a is turned off and the calculational formula, if it has been selected, is deleted (step S10). Then, the flow proceeds to step S11, where the line diameter "0.28 mm" is displayed. More specifically, the data about the line diameter of 0.28 mm is read from the ROM 12, and is supplied via the output port 15 to the display unit 5, where the numerical value "0.28" is displayed on its line diameter display portion 5b. Then, the flow goes to step S12, where the calculational formula $$y = a_1 x^3 + b_1 x^2 + c_1 x$$

is established, where y is the length of line and x is the number of revolutions made by the spool. This formula is suitable for the calculations of the length of the payed out portion and the length of the wound portion of the line. Simultaneously, the constants $a_1$, $b_1$, $c_1$ of the three terms are set. These constants are adapted for the measurement of the length of the line having the diameter of 0.28 mm. The constants and the three-term formula are stored in the ROM 12. If the operation of the switch 19 is completed simply by closing it once, then the line diameter is set to 0.28 mm, and the corresponding calculational formula is selected.

If the set switch 19 is again depressed, the flow proceeds to step S13, where the value "0.28" on the display portion 5b which was set upon the first closure of the switch 19 is turned off. Also, the corresponding calculational formula is deleted. Then, the flow proceeds to step S14, where the processing for displaying the line diameter 0.30 mm is carried out. More specifically, the data about the line diameter 0.30 mm is read from the ROM 12 and supplied via the output port 15 to the display unit 5 to display the numerical value "0.30" on the line diameter display portion 5b. Then, the flow goes to step S15, where the flow goes to step S15, where the calculational formula $$y = a_2 x^3 + b_2 x^2 + c_2 x$$

suitable for the release and winding of a line having a diameter of 0.30 mm is set. At the same time, the constants $a_2$, $b_2$, $c_2$ of the three terms are set.

If the set switch 19 is then depressed, the flow proceeds to step S16, where the display which was made by the second operation is put out and the calculational formula set by the second operation is deleted in the same manner as the foregoing. Subsequently, the flow proceeds to step S17, where the line diameter 0.35 mm is displayed. After the completion of this line diameter display operation, the flow goes to step S18, where the calculational formula $$y = a_3 x^3 + b_3 x^2 + c_3 x$$

suitable for the measurement of the length of the payed out portion and the length of the wound portion of a line having a diameter of 0.35 mm is set. At the same time, the constants $a_3$, $b_3$, $c_3$ of the three terms are set.

Thus, when the diameter of the fishing line 3 wound on the spool 2 is displayed on the display portion 5b, if the set switch 19 is opened, the calculational formula displayed on the display portion 5b is established. Then, the length of the payed out portion and the length of the wound portion are calculated using this formula.

The manner in which the total length of the line actually wound on the spool 2 is entered into the reel is now described by referring to FIG. 6. When the mode selector switch 18 is operated to place the microcomputer 10 in the total line length input mode, "CAP." 5b of the display unit 5 lights up, indicating the total line length input mode. Concurrently, as shown in step S20 of FIG. 6, data about the displayed maximum value on the line length display portion 5c of the display unit 5 is written to the RAM 13. In particular, in the present specific example, the maximum value displayed on the portion 5c is "199" (in meters). The data about this value has been previously written to the ROM 12, and is also written to the RAM 13 under the direction of the CPU 11. The data about the maximum value is supplied via the output port 15 to the line length display portion 5c, so that the value "199" is displayed on this portion. Then, the flow proceeds to step S21 to ascertain whether the set switch 19 has been depressed. If the decision is "YES", i.e., the switch 19 was depressed once, the flow goes to step S22, where the signal from the switch is applied via the input port 14 to the CPU 11 to carry out the subtraction 199−1. As a result, the RAM 13 is decremented by one. At the same time, "198" (199−1) is displayed on the line length display portion 5c (step S23).

By intermittently closing the set switch 19 in the same way, the RAM 13 is decremented one by one, and the display presented on the line display portion 5c changes as 198, 197, ..., 0. Thus, when the value displayed on the line length display portion 5c reaches the substantial total length, e.g., 130 m, wound on the spool 2, if the operation for turning on and off the switch 19 is stopped, the value 130 m is written to the RAM 13 as the actual total length. Then, the reset switch 20 is closed to make the displayed value of the line zero.

If the apparatus is so designed that when the set switch 19 is continuously depressed for 1 to 2 seconds, free-running pulses, for example, of 8 Hz are produced, then the combination of the free-running pulses and one pulse which is produced each time the switch 19 is closed permits speedier setting of the total line length.

The operation for measuring the length of the payed out portion and the length of the wound portion of the fishing line 3 during casting is next described by referring to the flowchart of FIG. 7. During an actual fishing, the mode selector switch 18 is operated to place the microcomputer 10 in the line length measurement mode after going through the steps S1 and S2 shown in FIG. 4. Thus, the symbol "DIST." 5e on the display portion 5 lights up, indicating the line length measurement mode. Under this condition, a fishing rod (not shown) on which the reel body 1 is mounted is swung downwardly so that a submerged fishing tackle (not shown) connected to the fishing line at the tip of the rod may be thrown toward a point. As the tackle travels toward the point, the line 3 wound on the spool 2 is payed out continuously. At the same time, the spool 2 is rotated toward the direction to pay out the line. This direction is hereinafter referred to as "the forward direction".

Thus, the processing for measurement according to the program is started. First, step S30 is executed to determine whether the line is payed out, which depends on whether which of the Hall effect devices 16a is first crossed by the magnetic field set up by the magnet 16b that is firmly secured to the spool 2. If the decision is YES, the flow proceeds to step S31 to cause the up/down counter 17 to count forward. The voltage signal which is produced once by the sensor 16 each time the spool 2 makes one revolution is shaped into pulse waveform by the waveform shaping circuit 16c and then applied to the counter 17, which counts its input pulses forward. The flow then goes to step S32, where the total count obtained by the counter 17 is output to the CPU. Then, the CPU carries out an arithmetic operation using the formula $Y=a_1x^3+b_1x^2+c_1x$ and based on the total count to find the length D of the payed out portion of the line. It is now assumed that the used fishing line has a diameter of 0.28 mm.

The length D found at step S32 is latched in a register (not shown) incorporated in the CPU 11 (step S33). The flow then proceeds to step S34 to deliver the latched length D to the line length display portion 5c so that the length D is displayed on the display portion 5c in digital form. Upon completion of the processing of step S34, the flow returns to step S30 to carry out the processings following step S31. As this sequence of operations is repeated, the value displayed on the display portion 5c is increased according to the length of the paid out portion of the line. At this time, the value displayed on the display portion 5c is varied in meters. When the tackle enters the water and the release of the line is stopped, the length at this instant is displayed on the line length display portion 5c. As an example, if the display value is "50", then it means that the fishing line has been paid out 50 m and that the point into which the tackle was thrown is about 50 m away from shore.

After it has been found from the countdown that the tackle has sunk to an intended depth of water, the rod and the steel are operated to move the tackle toward shore. More specifically, the handle 9 is rotated to turn the spool 2 toward the direction to wind up the line, i.e., in the reverse direction. Then, the line 3 is continuously wound up on the spool 2. At the same time, the microcomputer 10 carries out a routine for the winding operation.

Specifically, when the spool 2 is rotated toward the direction to wind up the line, the rotation and its direction are detected by the sensor 16, and the resultant signal is applied to the microcomputer 10. Then, step S30 in FIG. 7 is carried out to determine that the line was not paid out. The flow then goes to step S35 to cause the up/down counter 17 to act as a down counter. The pulses which are produced one for each revolution of the spool 2 are applied to the counter 17, in order that the total count obtained upon the release of the line be decremented. The flow proceeds to step S36, where the CPU receives the total count derived by the counter 17, and it carries out the calculation $$Y=a_1x^3+b_1x^2+c_1x$$

based on the count to calculate the length d of the wound portion of the line. Step S37 is carried out to subtract the length d from the length D of the paid out portion. Then, step S38 is performed to latch the result of this subtraction in the register incorporated in the CPU 11. The flow goes to step S39 to supply the latched length (D−d) to the line length display portion 5c, which then displays the length (D−d) in digital form.

After completing the processing of step S39, the flow proceeds to step S40 to ascertain whether the value of the subtraction (D−d) at step S38 is equal to 2 m. That is, the step is carried out to determine whether the length of the line from the tip of the rod to the tackle has become about 2 m. If the decision is NO, then the flow returns to step S36 to calculate the length d of the wound portion. If the relation D−d=2 is obtained at step S40, the flow proceeds to step S41 to deliver an instruction for driving the alarm 23. Then, the alarm beeps intermittently to warn the angler that the release of the line 3 will soon be ended. Simultaneously, excessive winding of the line 3 is prevented; otherwise the tackle would collide on the tip of the rod and damage it. That is, the tip of the rod is protected against damage. When the paid out portion is fully wound up, the flow proceeds to step S42 to reset the line length display portion 5c to zero volume. When a fish hits the tackle, the pull on the line will change, varying the force that winds up the line on the spool 2. As the diameter of the winding of the line varies, an error may be produced between the length of the payed out portion and the displayed value. However, the novel apparatus is unaffected by these undesirable phenomena. Whenever the release of the line is initiated, the displayed value indicates zero. Under this condition, the line length is measured. When the latched length D−d is less than unity, the value is set equal to zero, i.e., D−d=0. Then, the flow proceeds to step S42.

That is, even if the fishing line 3 has been fully wound up, an error in the length of the paid out portion may make the result of calculation displayed on the line length display portion 5c greater or smaller then zero. Even if such a situation takes place, the nonzero value is canceled. Accordingly, the aforementioned error in the displayed value can be eliminated each time a new casting is made. This prevents error from becoming accumulated and permits accurate display of the length of the paid out portion at all times.

While the line is being wound up on the spool 2, the total length of the line is entered into the reel in the manner described below. First, the microcomputer 10 is placed in the total line length input mode. Under this condition, the handle 9 is operated to rotate the spool 2 so that the fishing line 3 may be wound on the spool 2 from its front end. It is desired that during this winding, a given tension be imparted to the line 3.

In this state, the pulses produced in response to the rotation of the spool 2 are counted forward by the up/down counter 17. The resultant total count is applied to the CPU 11 with the arithmetic period of the microcomputer 10. Then, an arithmetic operation is performed using the calculational formula $$Y=a_1x^3+b_1x^2+c_1x$$

The result of the calculation is displayed on the display portion 5c and stored in the RAM 13. The content of the RAM is updated as each calculation is performed. If the used fishing line has been totally wound up, its total length is displayed on the display portion 5c. At the same time, the data about the total length is stored in the RAM 13. In the example described thus far, the total length is input to the reel while the total length of the line is being actually measured, and therefore the input operation is precise.

Figure 8:
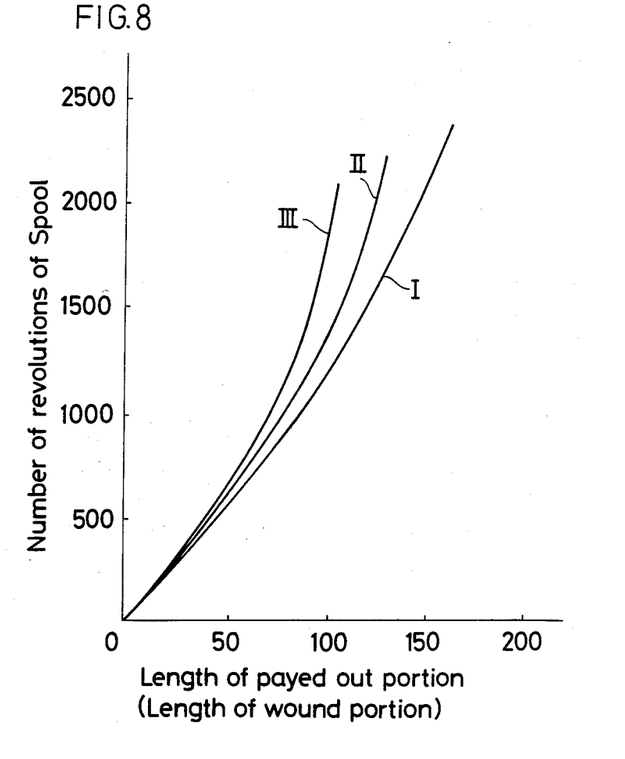
FIG. 8 is a curve showing the relation of the number of revolutions made by a spool to the length of a line, the relation being utilized in the first example.

FIG. 8 shows characteristic curves of the number of revolutions of the spool plotted against the length of the paid out or wound portion of a fishing line. Curves I, II, and III were obtained when fishing lines having diameters of 0.28 mm, 0.30 mm, and 0.35 mm were respectively used. The characteristics of these curves were derived from actual measurements. The above-described formula $$y = ax^3 + bx^2 + cx$$

was derived so that these characteristic curves may be obtained corresponding to the diameter of the line.

In the above example, the calculational formula relying on the number of revolutions made by the spool has three terms. It is also possible to use a calculational formula having two terms. In this case, a less operational load is imposed to the microcomputer. Further, data that is input about the diameter of line is not limited to data consisting of three kinds of data items.

As thus far described, in the present example, a calculational formula which is adapted for each different diameter of line is selected, and the length of line is measured and calculated using this formula, thus enhancing the accuracy with which the length of the paid out portion and the length of the wound portion are measured. When the winding operation of the released line is completed, the displayed value which is the length of the paid out portion minus the length of the wound portion is automatically reset to zero when the released portion is fully wound up. Therefore, even after release and winding are repeatedly carried out, no error will take place between the two displayed values. Hence, the length of line, especially the length of the paid out portion, can be accurately displayed. Also, since the total length of the line wound on the spool is entered into the reel, the angler can precisely know this total length. Further, in case where the paid out portion breaks, it is possible to know the total length of the remaining portion of the line. This facilitates controlling the fishing line.

Figure 9:
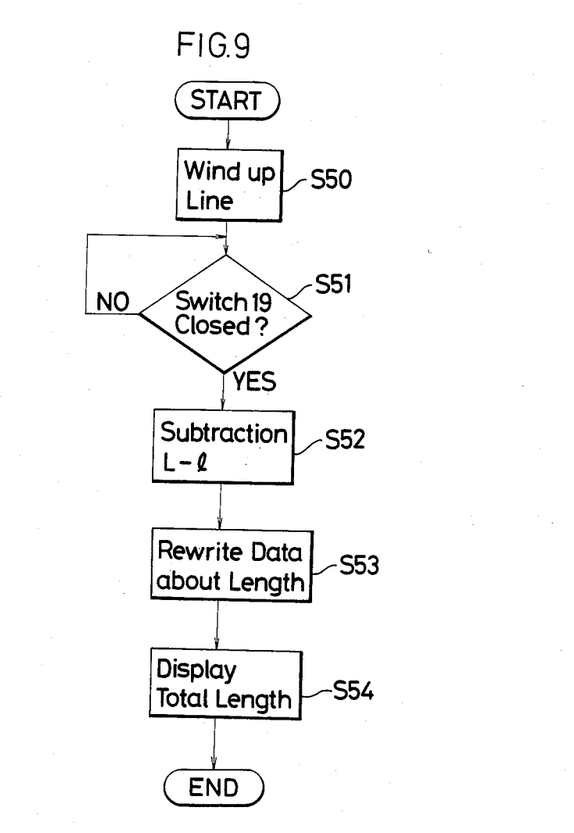
FIG. 9 is a flowchart showing a sequence of operations performed by a total line length correcting means for use with the casting reel of the second example of the invention.

A second example of the invention is next described by referring to FIG. 9. This example is similar to the first example except that a function of correcting the total length of line is added to the set switch 19. Accordingly, we will describe only the operation for correcting the total length when the paid out portion breaks.

Referring to FIG. 9, step S50 is carried out to wind up the paid out portion of the line. This step corresponds to steps S35–S39 in FIG. 7. We now assume that the following situation occurred. The handle 9 was operated to rotate the spool 2 for winding up the paid out portion of the line, and the routine of step S50 was carried out. At this time, the submerged tackle was firmly caught on a rock or the like. Then, the angler forcefully pulled the line to disengage the tackle, but it broke. Subsequently, the remaining, paid out portion was fully wound up. The line length display portion 5c indicated 20 m.

The winding of the spool 2 is stopped, and the set switch 19 is closed. Then, the flow proceeds to step S51 to determine whether the switch 19 was closed. If the decision is YES, the flow goes to step S52 to subtract the length l of the lost portion from the total length L (130 m) of the line already stored in the RAM. The length l corresponds to the value presented on the display portion 5c. Let us assume that the length L1 of the payed out portion is 50 m and that the display portion 5c reads "20" upon the completion of the winding of the cut line. Thus, the length l of the cut off portion is 20 m. Accordingly, step S52 is carried out to perform the calculation $$L - l = 130 - 20 = 110$$

Then, the flow proceeds to step S53, where the data about the total length of 130 m already stored in the RAM 13 is changed to data about 110 m. Then, the flow proceeds to step S54 to display the corrected total length of the line. More specifically, the line length display portion 5c is caused to indicate 110. This numeral is turned on and off, informing the angler that the total length was corrected. After the lapse of two seconds, the flashing numeral on the display portion is automatically put out. Then, the microcomputer returns to the measurement mode, thus completing the preparations for the next fishing.

As thus far described, the second example of the invention yields the same advantages as the first example. Further, even if the paid out portion breaks, the total length of the line is automatically corrected in such a way that the length of the lost portion is subtracted from the total length. Therefore, the angler can always precisely know the length of the payed out portion by means of the correctly presented display.

Figure 10:
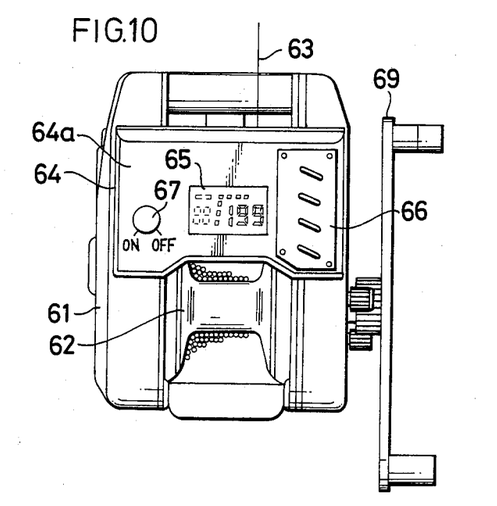
FIG. 10 is a plan view of the casting reel of a third example of the invention.
Figure 11:
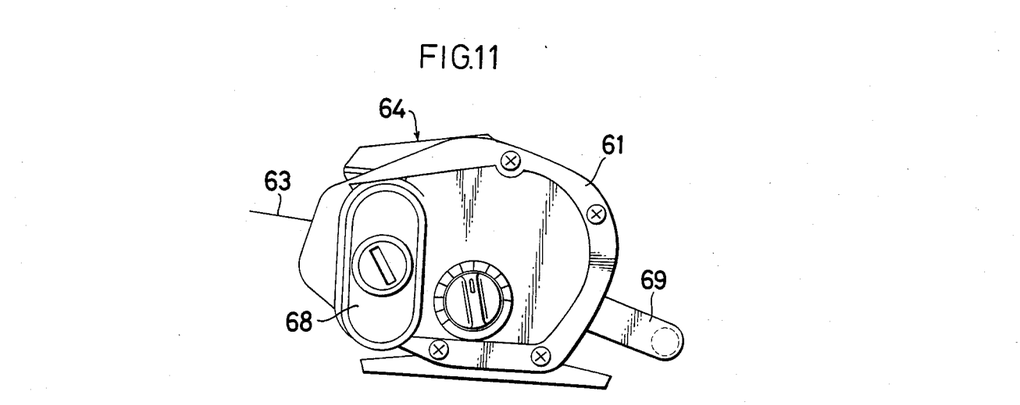
FIG. 11 is a side elevation of the reel shown in FIG. 10.

A third example of the invention is next described by referring to FIGS. 10–14. FIGS. 10 and 11 are a plan view and a side elevation, respectively, of the casting reel of this example. A spool 62 is rotatably mounted to the body 61 of the reel. A fishing line 63 is coiled on the spool 62. A waterproof housing 64 is mounted integrally with the body 61. The housing 64 has an upper panel 64a, on which a display unit 65, a keyboard 66, and a power switch 67 are installed in a watertight manner. The housing 64 incorporates a sensor (described later) for detecting the rotation of the spool 62 and its direction. The housing 64 also incorporates a microcomputer (described later) and other components. The microcomputer functions to calculate the length of line from the number of revolutions detected by the sensor. The microcomputer also serves to produce an alarm instruction against which the movement of the submerged tackle is judged. The housing 64 is further provided with a recess 68 for receiving a small-sized electric battery. A handle 69 is provided to turn the spool.

Figure 12:
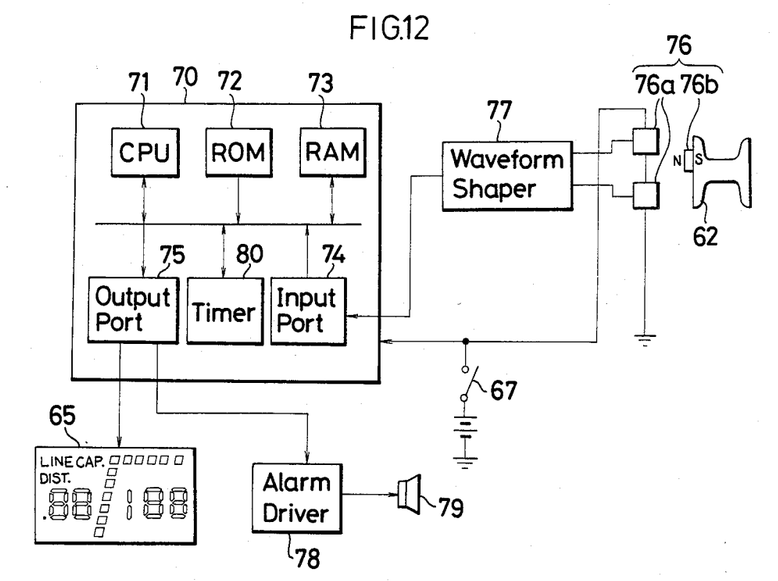
FIG. 12 is a block diagram of the casting control unit of the third example.

FIG. 12 schematically shows the structure of the internal circuit of the casting reel in this example, the circuit acting to measure the length of line and produce timing instructions. The aforementioned microcomputer is indicated by reference numeral 70, and is composed of a CPU 71, a ROM 72, a RAM 73, an input port 74, and an output port 75. The CPU 71 calculates the length of line, performs a countdown for the tackle, and issues alarm instructions against which the movement of the tackle is judged when it is being drawn. Programs for these calculations and operations are stored in the ROM 72. The result of the calculation and other data are stored in the RAM 73.

The above-described sensor for detecting the rotation and its direction is denoted by reference numeral 76, and is comprised of a pair of Hall effect devices 76a and a magnet 76b firmly fixed to the spool 62. Whenever the spool 62 makes one revolution, the magnetic field developed by the magnet 76b acts on the Hall effect devices 76a, producing a voltage having a certain phase across the devices. The direction of the voltage depends on whether the spool 62 rotates forward or rearward. The voltage is applied to a waveform shaping circuit 77 to shape it to pulses having a frequency proportional to the rotational frequency of the spool 62. The pulses are furnished via the input port 74 to the CPU 71. Then, an up/down counter (not shown) incorporated in the CPU counts the pulses forward or backward. The length of the paid out portion and the length of the wound portion of the line are calculated from the obtained total count with its arithmetic period. The result of the calculation performed by the CPU 71 is supplied via the output port 75 to the display portion 65, so that it is displayed in digital form.

An alarm driver circuit 78, to which an alarm 79 is connected, is connected with the output port 75. The alarm 79 is caused to sound at regular intervals of, for example, 1 second, while a countdown is being performed from the instant at which the fishing tackle is thrown into the water. When the tackle is drawn from a layer in which fish swim by rotating the reel, the alarm is made to sound for every unit length of the wound line, e.g., 3 m. This alarm sound provides a standard against which the countdown for the tackle and the manner of pulling are judged. A timer 80 used for the timing purpose as described above is incorporated in the microcomputer 70.

Figure 13:
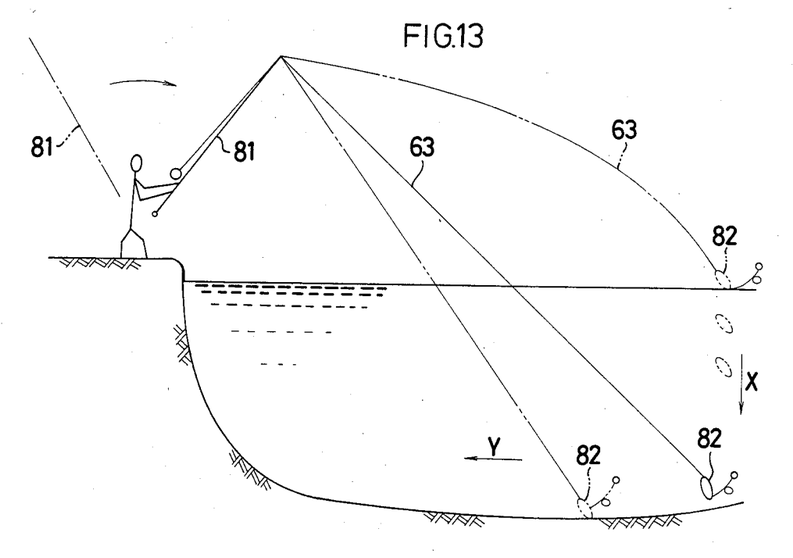
FIG. 13 is a pictorial representation illustrating the manner in which a fishing line is cast when the third example is employed.

The operation of the casting reel constructed as described above is next described. When a casting is made, the power switch 67 is first closed to initialize the microcomputer 70. Under this condition, a fishing rod 81 held by an angler is swung downwardly toward the position indicated by the solid line from the position indicated by the phatom line, as shown in FIG. 13, whereby a tackle 82 including a weight is thrown into a point with its tip foremost. As the tackle 82 travels toward the point, the fishing line 63 is continuously paid out. This causes the spool 62 to rotate toward the direction to release the line, i.e., in the forward direction. This rotation of the spool 62 is detected by the sensor 76. The voltage signal which is produced one per revolution of the spool by the sensor 76 is shaped into pulse form by the waveform shaping circuit 77. These pulses are supplied via the input port 74 to the CPU 71, and then they are counted forward by the up/down counter (not shown) in the CPU. A total count corresponding to the number of revolutions made by the spool 62 is obtained with the line length calculational period of the microcomputer 70. Then, the length of the paid out portion is calculated from this total count in accordance with the calculational program stored in the ROM 72. The result of this calculation is supplied via the output port 75 to the display unit 65 to display the length in digital form in meters.

A reference alarm signal is produced to forecast the sinking of the tackle and also to control the pulling of the tackle. The manner in which this reference alarm signal is produced is next described by referring to the flowchart of FIG. 14.

First, the rod is swung downward to cause the tackle 82 to travel toward a desired point. This rotates the spool 62, initiating the program shown in FIG. 14. First, step S91 is carried out to ascertain whether the line was paid out. This ascertainment is performed by sensing whether the spool 62 rotated by the release of the line made, for example, six or more revolutions in the forward, or clockwise, direction. The release is caused by the throw of the tackle.

Figure 14:
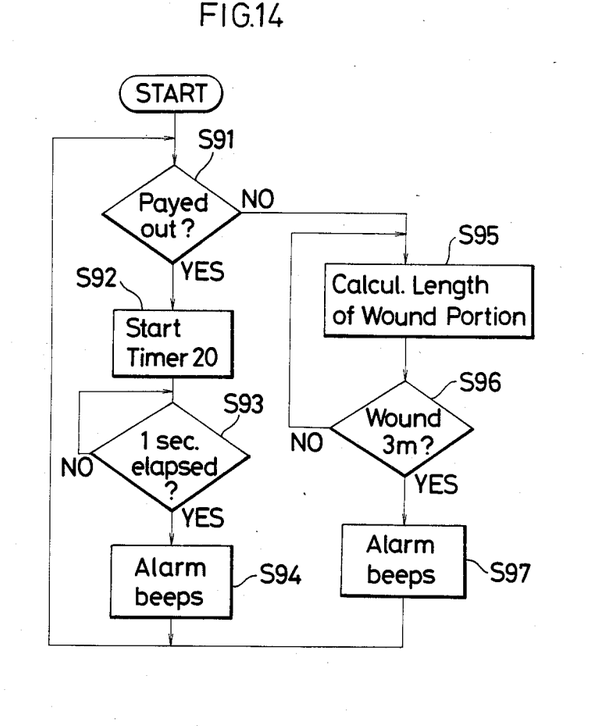
FIG. 14 is a flowchart showing the sequence of operations for producing an alarm sound using the third example.

If the decision at step S91 is YES, then the flow goes to step S92 to start the timer 80 incorporated in the microcomputer 70. Subsequently, step S93 is carried out to cause the timer 80 to deliver a timing signal whenever the timer measures each given time period, for example, 1 second. Thereafter, the flow goes to step S94, where the timing signal is delivered to the alarm 79 via the output port 75, thus causing the alarm 79 to beep every second. This alarm sound forming the basis for time measurement is produced from the beginning of the release of the line until the winding of the line on the reel is started.

Thus, when the sinking of (or countdown for) the tackle 82 through the water in the direction indicated by the arrow X is to be forecasted as shown in FIG. 13, the alarm sounds are counted from the beginning of the sinking of the tackle 82, whereby the depth of water at which the tackle 82 has arrived can be readily and correctly estimated. This is especially effective for the case where the tackle is suspended in the water in a region where many rocks exist, i.e., the tackle is easily caught on a rock.

After it has been found from the countdown that the tackle has sunk to a bottom or a desired layer in which fish swim, the rod and the reel are operated to move the tackle 82 toward shore. For this purpose, the handle 69 is operated to rotate the spool 62 toward the direction to wind up the line, i.e., in the backward direction. Thus, the fishing line 63 is continuously wound up on the spool 62 to thereby move the tackle 82 toward shore, or the position of the angler. At the same time, the microcomputer 70 is placed in the winding-up mode.

More specifically, when the spool 62 is rotated toward the direction to wind up the line, the rotation and its direction are detected by the sensor 76. The resultant signal is applied to the microcomputer 70, where the up/down counter having the total count corresponding to the length of the paid out portion is decremented. Then, the length of the payed out portion is calculated from the resultant value, and the data is fed to the display portion 65 to display the length in digital form.

Since the spool 62 rotates toward the direction to wind up the line, the decision at step S91 shown in FIG. 4 is NO. Then, the flow proceeds to step S95, where the length of the wound portion is calculated from the number of revolutions made by the spool 2.

The next step S96 is carried out to ascertain whether the length obtained by the calculation has reached 3 m. If the decision is NO, then the flow returns to step S95, and the processings of steps S95 and S96 are repeatedly carried out until the calculated value arrives at 3 m. If the decision at step S96 is YES, then the flow goes to step S97 to cause the CPU 71 to deliver a signal for driving the alarm 79, whereby the alarm 79 beeps and each time the fishing line 63 is further wound up 3 m. At the same time, the tackle 82 is moved in the direction indicated by the arrow Y in FIG. 13.

Consequently, the angler who operates the reel to wind up the line is able to know the distance traveled by the tackle by counting the alarm sounds without the need to watch the display unit 65. At the same time, by controlling the rotational frequency of the spool 62, the velocity at which the tackle 82 moves through the water can also be controlled. By using repeated winding and pause together with such a control, the movement of the lure attached to the tackle can be made to approach the movement of a real bait. Additionally, the angler can control the timing simply by utilizing the alarm sound. Also, it is easy to strike a fish when the angler feels a bite. Furthermore, it is easy to know the position of a fish when the tackle is drawn, by counting the number of the alarm sounds.

It is to be understood that the time intervals at which the alarming sounds are produced to provide the reference for the countdown regarding the tackle and for the judgment of the pulling of the tackle are not limited to the above examples.

As thus far described, in the present example, alarm sounds are generated at regular time intervals by the timer means which is started with the release of the fishing line that is caused by the casting of the tackle. Also, when the reel is rotated to wind up the line for moving the tackle, alarm sounds are produced for every unit length of the wound line. Therefore, the angler can understand the condition of the sinking of the tackle, or the countdown after it has entered the water by hearing the regularly produced alarm sounds. Further, the alarm sounds which are produced for every unit length of the wound line permit the angler to optimally control the distance that the pulled tackle moves as well as its velocity. He can also easily know points at which fish swarm, thus facilitating casting.

What is claimed is:

1. A reel for fishing, comprising:
a reel body;
a spool which is rotatably held to the reel body and on which a fishing line is wound;
sensor means for detecting the rotation of the spool and for providing pulse-form signals having a repetition frequency proportional to the rotational frequency of the spool;
a microcomputer, including an up/down counter which is incremented by said signals from the sensor means to count the number of revolutions made by the spool when the fishing line is paid out, the counter being also selectively capable of being decremented by said signals from the sensor means;
the microcomputer including CPU means for calculating the length of the paid out portion and the length of the wound portion of the fishing line from the total count obtained by the counter according to a selected stored nonlinear formula for calculating length of line as a function of the number of revolutions made by the spool;
a display unit driven by the microcomputer for displaying the calculated lengths;
the microcomputer including a memory for storing a plurality of different such formulas corresponding to various possible diameters of lines;
line diameter selective input means for selecting for use by the CPU means one of said formulas corresponding to the diameter of the line wound on the spool; and
means for resetting the value displayed on the display unit to zero when the paid out portion of the fishing line if completely wound up on the spool;

2. A reel for fishing according to claim 1, further comprising means, when the paid out portion has broken, for causing the microcomputer automatically to correct the total length of the fishing line wound on the spool by subtracting the length of the lost portion from the total length.

3. A reel for fishing, comprising:
a reel body;
a spool which is rotatably held to the reel body and on which a fishing line is wound;
sensor means for detecting the rotation of the spool and for providing pulse-form signals having a repetition frequency proportional to the rotational frequency of the spool;
a microcomputer, including an up/down counter which is incremented by said signals from the sensor means to count the number of revolutions made by the spool when the fishing line is paid out, the counter being also selectively capable of being decremented by said signals from the sensor means;
the microcomputer including CPU means for calculating the length of the paid out portion and the length of the wound portion of the fishing line from the total count obtained by the counter according to a selected nonlinear formula for calculating length of line as a function of the number of revolutions made by the spool;
a display unit driven by the microcomputer for displaying the calculated lengths;
the microcomputer including a memory for storing one of plurality of different such formulas corresponding to various possible diameters of lines;
line diameter input means for selecting for use by the CPU means one of said formulas corresponding to the diameter of the line wound on the spool;
means for resetting the value displayed on the display unit to zero when the paid out portion of the fishing line if completely wound up on the spool;
timer means which is started with the beginning of the release of the fishing line when a submerged fishing tackle is cast and which delivers a timing signal at regular time intervals;
means for producing a signal as every given length of the line is wound up by rotating the spool after the tackle is submerged under the water; and
an alarm that is caused to sound by the means for producing a signal and by the timing signal.

4. A reel for fishing according to claim 1, wherein the microcomputer includes an input port and input switch means connected with the input port for entering the total length of the line wound on the spool into the reel.

5. A reel for fishing according to claim 4, wherein the microcomputer causing the display unit to display a digital form length value, the microcomputer being caused by said input switch means to decrement the value that is displayed in digital form for indicating the total length of line wound on the spool.

6. A reel for fishing according to claim 4, wherein the microcomputer causing measuring, in response to said sensor means, the length of the fishing line which has been previously wound on the spool.

7. A reel for fishing according to claim 1, wherein each of said nonlinear formulas is of the form $$y = ax^3 + bx^2 + cx$$

where y is the length of the line, x is the number of revolutions made by the spool, and a, b and c are constants selected for the diameter of the line, the constants being different for different line diameters, each such formula thus expressing a characteristic nonlinear curve for each different diameter of line.

* * * * *